(12) United States Patent
Doll

(10) Patent No.: US 6,573,614 B2
(45) Date of Patent: Jun. 3, 2003

(54) DEVICE AND METHOD FOR CONTROL OF MOTOR VEHICLE ENGINE IDLE RPM TO PREVENT DISRUPTIVE BATTERY DISCHARGE

(76) Inventor: Martin J. Doll, 3918 Bardstown Rd., Louisville, KY (US) 40218

(*) Notice: Subject to any disclaimer, the term of this patent is extended or adjusted under 35 U.S.C. 154(b) by 73 days.

(21) Appl. No.: 09/939,492

(22) Filed: Aug. 27, 2001

(65) Prior Publication Data

US 2003/0052486 A1 Mar. 20, 2003

(51) Int. Cl.[7] ............................................. H02K 23/60
(52) U.S. Cl. .............................. 290/40 C; 290/40 R
(58) Field of Search ............................. 290/40 C, 40 R; 320/29, 25

(56) References Cited

U.S. PATENT DOCUMENTS

| | | | | |
|---|---|---|---|---|
| 4,493,301 A | * | 1/1985 | Abe | 123/339.21 |
| 4,553,516 A | * | 11/1985 | Hasegawa | 290/40 C |
| 4,629,968 A | * | 12/1986 | Butts et al. | 322/29 |
| 4,794,898 A | * | 1/1989 | Kato | 290/40 C |
| 5,459,357 A | | 10/1995 | Minks | 307/10 |
| 5,467,008 A | | 11/1995 | Uchinami | 322/27 |
| 5,523,672 A | * | 6/1996 | Schramm et al. | 322/25 |
| 5,712,786 A | * | 1/1998 | Ueda | 701/110 |
| 5,831,411 A | * | 11/1998 | Klauer et al. | 290/40 R |
| 5,978,719 A | * | 11/1999 | Yano et al. | 701/22 |
| 5,998,881 A | | 12/1999 | Wind et al. | 290/40 A |
| 6,274,944 B1 | * | 8/2001 | Letang | 290/40 R |

FOREIGN PATENT DOCUMENTS

| | | | | |
|---|---|---|---|---|
| DE | 3729968 A1 | * | 3/1989 | B60R/16/04 |
| EP | 379357 A2 | * | 7/1990 | H02J/7/14 |
| WO | WO 9424755 A1 | * | 10/1994 | H02J/7/14 |

* cited by examiner

Primary Examiner—Joseph Waks
(74) Attorney, Agent, or Firm—Maurice L. Miller, Jr.

(57) ABSTRACT

A method and device for increasing the idling speed of an engine of a motor vehicle from a normal idle speed level to a higher preselected maximum idle speed level in response to a low output voltage from a power generating system of the engine and vehicle is disclosed for the purpose of preventing a severe discharge of a storage battery of the system to prevent disruption of engine ignition and reduced effectiveness of vehicle electrical components and to increase the service life of the battery and an electrical alternator of the system. The device can be operated in conjunction with or as a part of an conventional electronic control module (ECM) of the vehicle to take over control of the idle speed of the engine when a predetermined low output voltage of the system is sensed. Upon assuming control of the engine idle speed, the device raises the idle speed to a predetermined maximum safe level and maintains that level independent of engine loading for purposes of charging the battery to increase the system output voltage. After the system output voltage is restored to a predetermined maximum value, the device returns engine idle control to the ECM. Various features of the device are disclosed which block or terminate operation of the device when necessary for reasons of safety and engine protection.

27 Claims, 7 Drawing Sheets

DEVICE AND METHOD FOR CONTROL OF MOTOR VEHICLE ENGINE IDLE RPM TO PREVENT DISRUPTIVE BATTERY DISCHARGE

BACKGROUND OF THE INVENTION

This invention relates to an electronic control device for automatically increasing an idle RPM level of an engine of a motor vehicle above a normal idle RPM to a higher preselected maximum idle RPM level to increase output voltage of an engine driven alternator to prevent or at least limit the rate of discharge of a storage battery of the vehicle. So long as the device is activated, the maximum RPM level is maintained regardless of variations in loading on the engine.

Broadly speaking, the idle RPM or idle speed of an internal combustion engine of a motor vehicle has long been controlled by electronic devices of the prior art. For example, modern automobile engines use a conventional electronic control module or ECM to control the normal idle speed of a vehicle engine, the normal idle speed usually being about 800 RPM in a standard internal combustion engine when running in a normal operating temperature range. Upon start-up of the engine, when cold, as when the vehicle has been inoperative for a long period of time in a wintry low temperature environment, the ECM will operate on start-up to increase the idle RPM to about 1000–1100 RPM, to aid in warming up the cold engine and to increase the operating temperature of various temperature sensitive components such as a catalytic converter and an oxygen sensor in the engine exhaust system. Once the engine has warmed up to a temperature at or near its normal operating temperature range, the ECM will operate to reduce the idle RPM back to the normal 800 RPM level and, thereafter, maintain that level subject to reductions that may occur due to variations in the loading on the engine.

In U.S. Pat. No. 5,998,881, granted to R. C. Wind et al. on Dec. 7, 1999, an apparatus and method is disclosed for reducing the idle speed of a vehicle engine from the normal 800 RPM idle level to a low level of about 500 RPM to improve vehicle fuel economy and reduce vehicle emissions. None of the aforementioned devices or methods of the prior art use an electronic device to increase engine idle RPM above normal idle RPM and maintain such an increased idle RPM at a preselected level regardless of engine load variations in response to a low vehicle electrical system output voltage in order to increase the output voltage so as to prevent a disruptive vehicle battery discharge and damage to an alternator of the electrical system. It would be advantageous to provide such a device for use in a motor vehicle, particularly a vehicle which is sometimes parked with the engine running at idle speed for long periods of time, during which periods there is a moderate to heavy demand for electrical energy being placed on an alternator of the vehicle by various electrical components and subsystems used by the engine and vehicle. A police cruiser is an example of a vehicle which has numerous specialized electrical and electronic systems which can place a heavy energy demand upon the vehicle alternator while the vehicle is parked, as at an accident scene, running at idle speed for a long period of time. Because of such routine operating conditions, the storage batteries and alternators in police vehicles often require relatively frequent replacement, all at substantial cost. In addition, the inconvenience and danger that can also result in leaving a police officer stranded with an inoperative vehicle and dead battery as, for example, at a rural accident site or emergency scene (out of range of a hand held transceiver to the nearest police radio repeater), in the dark of night in severe winter weather with no high powered mobile radio communications link to his or her dispatcher and with no use of other electrical and electronic systems ordinarily available in an operative police vehicle, can be a serious problem.

Because the battery in a police cruiser is frequently discharged in the normal course of cruiser operation, the battery usually must be replaced frequently. Moreover, because the alternator of the cruiser is frequently required to deliver heavy current to such a severely discharged battery at or above its total rated maximum output, the alternator, likewise, must frequently be replaced.

Another prior art engine idle control apparatus is manufactured and sold in this country by Response Technologies, Inc. of Flanders, N.J. This apparatus, sold as a TCS-100 automatic engine idler, increases the idle speed of a motor vehicle engine from a normal idle RPM level to a higher RPM level in response to a low output voltage of the vehicle electrical power generating system, but does so by activating a vacuum servomechanism to open a fuel throttle of the engine by a calibrated or measured amount. Then, when the output voltage of the system increases to a preselected maximum value, the apparatus operates to, in turn, cause the servomechanism to close the throttle by the same calibrated or measured amount.

A difficulty encountered with this type of apparatus is that the higher RPM level is dependent upon loading and load variations on the engine. In other words, heavy loading or load variations on the engine will cause the higher RPM level to be reduced or subject to variations. Also, the chain or cable running from the servomechanism to the engine throttle will be subject to small length changes with age and variations in ambient temperature which can effect the amount of opening of the throttle and, thus, effect the higher RPM level sought to be obtained. Further, if the chain or cable were to fail, as for example, by reason of aging, rust or the like, the apparatus would be rendered inoperative. Finally, the subject apparatus does not control idle RPM level in the same manner as does an ECM of the vehicle.

By means of my invention, these and other shortcomings of the prior art are substantially eliminated.

SUMMARY OF THE INVENTION

It is an object of my invention to provide a device for controlling the idle speed of an engine of a motor vehicle to maintain a high output voltage level of an engine driven alternator of an electrical power generating system of the vehicle to prevent a disruptive discharge of a storage battery of the system.

It is a further object of my invention to provide an electronic device for increasing the idle speed of an engine of a motor vehicle to increase the output voltage of an engine driven alternator of an electrical power generating system of the vehicle to supply electrical load requirements of electrical components of the engine and vehicle without severely discharging a storage battery of the system.

It is also an object of my invention to provide a process or method for closely controlling an idle RPM of an engine of a motor vehicle, independent of engine loading, for preventing or at least limiting a disruptive discharge of a storage battery of an electrical power generating system of the vehicle.

It is another object of my invention to provide a device and method for closely controlling idle speed of an engine of a vehicle, regardless of engine loading, in response to low voltage output of an electrical power generating system of the vehicle to minimize vehicle storage battery discharge and damage to a vehicle alternator.

Briefly, in accordance with the objects of my invention, there is provided a device for assuming control of an idle speed control apparatus of an engine of a motor vehicle which is normally controlled by an ECM of the vehicle, the device comprising means for monitoring an output voltage of an electrical power generating system of the engine and vehicle. The device also includes means responsively connected to the monitoring means for generating a first signal indicative that the output voltage is less than a first preselected minimum value. The device further includes means responsively connected to the first signal generating means for generating a second signal which is capable of controlling the idle speed control apparatus of the engine to increase an idle speed of the engine from a normal idle speed level to a higher preselected maximum idle speed level. The device still further includes means responsively connected to the first signal generating means for switching control of the idle speed control apparatus from the ECM to the second signal generating means in response to the first signal.

These and other objects, features and advantages of my invention will become apparent to those skilled in the art from the following detailed description and attached drawings, upon which, by way of example, only the preferred embodiments of my invention is illustrated.

DESCRIPTION OF THE PREFERRED EMBODIMENT

Figure 1:
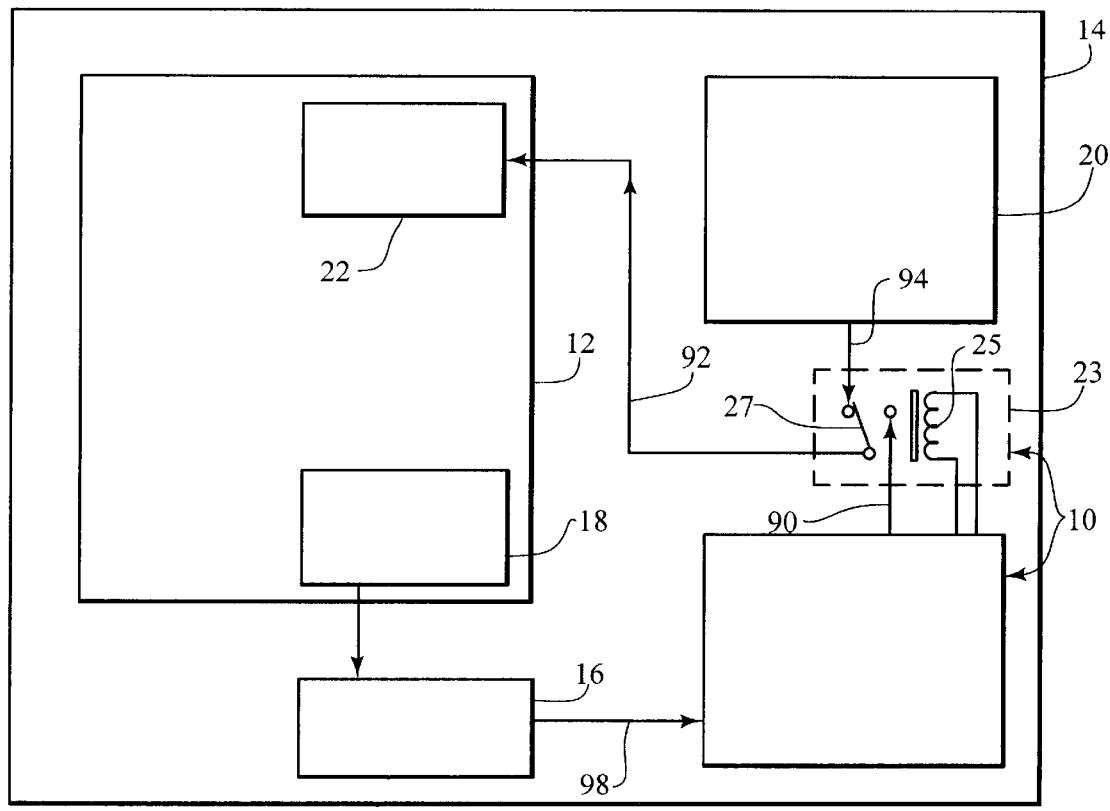
FIG. 1 shows a block diagram of a motor vehicle, including an engine, an electrical power generating system with storage battery, a conventional electronic control module and a novel electronic device for controlling the idle RPM of the engine in accordance with my invention.

Referring now to the drawing figures and, in particular, to FIG. 1, there is shown, in a preferred embodiment of my invention, a device, generally designated 10, for controlling idle RPM or idle speed of an engine 12 of a motor vehicle 14. The purpose of the device 10 (an electrical circuit diagram of which is shown in FIG. 3) is to prevent or at least limit and minimize a severe or disruptive discharge of a battery 16 of a conventional electrical power generating system 18 used by the engine 12 and vehicle 14. The severe or disruptive discharge of which I speak is a substantial and/or prolonged discharge of the battery 16 sufficient to place a heavy load on an alternator of the system 18 and to reduce output voltage of the system 18 to such a low value that effective operation of vehicle electrical components is reduced. Such a discharge, if permitted to continue, will ultimately result in failure of the ignition system of the engine 12 to sustain firing of its cylinders, causing engine shut down, usually with no ability of the severely discharged battery 16 to restart the engine. The device 10 can be used with a wide variety of motor vehicle engine types, including both gasoline and diesel powered engines. The device 10 of the present example is especially useful with gasoline engines in police and other emergency vehicles.

Police vehicles typically contain numerous electrical components such as front flashers, overhead light bar, spot light, radio communications equipment, video monitoring equipment and radar in addition to the usual wipers, heater and air conditioner with blower, fuel pump, head lights, interior lights, radiator cooling fan, rear window defroster and the like. Often, a majority of these components will be in use at the same time as, for example, when a police vehicle is parked at the scene of a highway accident at night during extreme high or low temperature conditions or during heavy rain, while the engine is running for a prolonged period of time at idle speed. Under such conditions, the demand placed on the system 18 by such components can run as high as 160 amps, whereas a typical alternator of the system may only be capable of delivering about 130 amps. and, only at that level, when the engine 12 is running at a speed well in excess of the normal idle speed. As a result, the battery 16 often will discharge at a rapid rate. But, at idle speed, typically about 800 RPM, the same alternator is typically capable of delivering only about 90 amps. to its load, which, at a 160 amp. demand, means the battery 16 will discharge at an extremely rapid rate. As a result, the output voltage of the system 18 will drop rapidly. At a reduced output voltage of about 12.0 volts, most police mobile radio transmitters will begin to suffer reduction in r.f. power output, thus affecting the transmitters range of radio communication. As the output voltage of the system 18 continues to decrease, headlights begin to dim and the effectiveness of other electrical components decreases markedly. Finally, at an output voltage of less than about 10.5 volts, the engine ignition system will be unable to sustain adequate firing of the engine cylinders, thus causing the engine 12 to shut down, leaving the officer stranded with a dead battery and, possibly, out of communication with his or her dispatcher by virtue of being out of range with his or her relatively low power hand held transceiver to a police repeater.

The device 10, when operative, is adapted to take over control of the idle speed of the engine 12 from a conventional electronic control module of ECM 20, which normally controls the same, by controlling an engine idle speed control means such as a valve or other type of throttle 22. This is accomplished, under prescribed conditions, through actuation of a relay 23 of the device 10 to shift operation of the throttle 22 from normal control by the ECM 20 to control by the device 10. The device 10 actuates the relay 23 by energizing a coil 25 of the relay. By de-energizing the relay coil, the device 10 permits a switch 27 of the relay 23 to return to its normal state, as shown, to return control of the throttle 22 from the device 10 to the ECM 20. The device 10, when activated, thus controls the idle speed of the engine 12 in the same manner as does the ECM 20 during normal operating condition.

Figure 2:
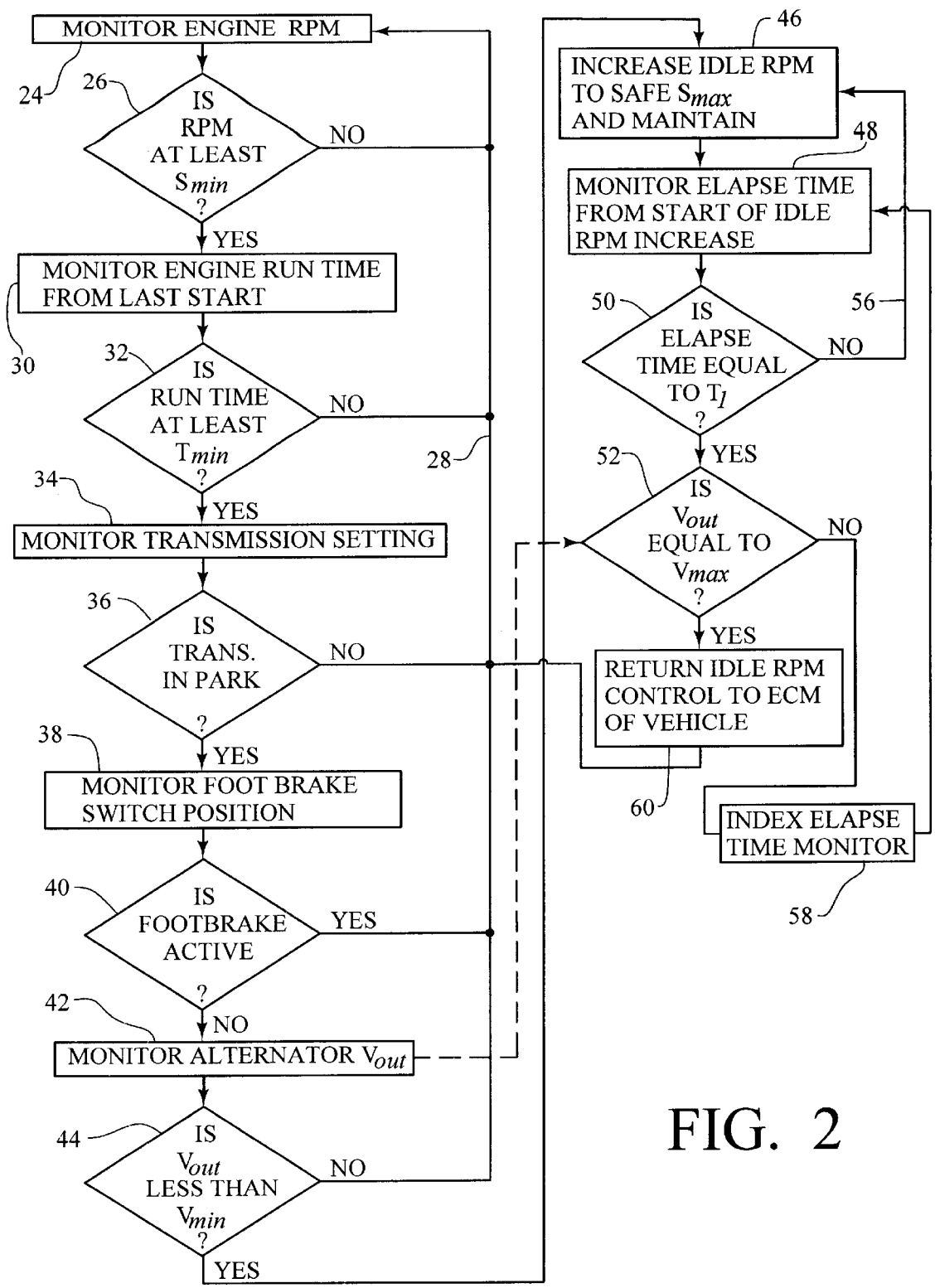
FIG. 2 shows a flow chart illustrating the operation of the idle RPM control device of FIG. 1 in accordance with the preferred method of my invention.

Referring now also to FIG. 2, a flow chart of operation of the device 10 is disclosed. When the engine 12 is started under cold conditions, the ECM 20 will typically operate to adjust the engine intake air valve 22 to raise the idle RPM to about 1000–1100 RPM and to approximately maintain that engine speed until the temperature of the liquid engine coolant increases to the value at or near normal coolant temperature for a warmed up engine 12. This increased idle speed also aids in warming up a catalytic converter and an oxygen sensor in the exhaust system of the engine 12. Both of these temperature sensitive components require relatively high temperatures for efficient and effective operation. Once the engine coolant and the temperature sensitive components reach their preselected set point temperatures, the ECM 20 automatically reduces the idle speed of the engine 12 back to the normal 800 RPM level by adjusting the intake air valve 22 in a reverse direction. A warm up cycle for the engine 12, when parked and running solely at an RPM level dictated by the ECM 20, from start up and running in the 1000–1100 RPM range to return of the warmed up engine to the normal 800 RPM idle level, takes about 4 minutes to complete.

Other than by adjusting the position of the intake air valve 22 to effect a high idle RPM during warm up and by otherwise adjusting the position of the intake air valve to return the engine 12 to a normal low level idle RPM following warm up, the ECM 20 exercises no other changes in the idle level of the engine 12. I prefer to block operation of the device 10 for a pre-selected time period following start up of the engine 12, for preferably about 5.0 minutes, to avoid interfering with the warm up function of the engine as regulated by the ECM 20. This will ordinarily give the ECM 20 more than enough time to complete the warm up of the engine 12 and the temperature sensitive components.

In FIG. 2 it will be seen that the program by which the device 10 operates is initiated at block 24 by monitoring engine RPM. This is done in a conventional manner by measuring the speed of rotation of a flywheel on a crankshaft of the engine 12. At block 26, a determination is made as to whether the engine 12 is running by determining whether the engine RPM is at least at a preselected minimum RPM level, designated $S_{min}$, which is sufficiently above the crank speed of the engine 12 during ignition start, preferably about 600 RPM. Since normal idle speed after warm up is about 800 RPM, but can be somewhat less under conditions of heavy and prolonged electrical loading on the alternator of the system 12, this provides a reasonable minimum RPM level to ascertain than the engine is, indeed, running. If the answer at block 26 is NO, the program returns to block 24 along a return line 28 and repeats the inquiry until a YES answer is obtained. When a YES answer is obtained at block 26, engine running time from the most recent start-up is monitored, as at block 30, and a determination is made at block 32 whether the engine running time from the most recent start-up has been at least a preselected minimum time period, designated $T_{min}$. As previously explained, I prefer to set $T_{min}$ in the range of from about 4 to 5 minutes, preferably the latter. If the answer at block 32 is NO the program returns to block 24 to begin again but, if YES, the setting of a transmission of the vehicle 14 is monitored, as at block 34, and inquiry is made at block 36 as to whether the transmission in a PARK condition. If NO, the program recycles to block 24 since I prefer not to use the device 10 to take over engine idle control and raise engine idle RPM with the vehicle transmission in gear for obvious safety reasons. But if the inquiry at block 36 results in a YES determination, the program proceeds to block 38 wherein a position of a foot brake switch is monitored.

Next, a determination is made as to whether the foot brake pedal switch is activated, as at block 40. If an operator's foot is applied to the brake pedal, there is a possibility that he or she is about to place the transmission in gear. Accordingly, for safety reasons, I prefer not to permit the device 10 to take control of engine idle RPM under such conditions so that, if the answer at block 40 is YES, the program recycles to the block 24. But, if the answer is NO, then, upon monitoring of the vehicle alternator or generator output voltage, designated $V_{out}$, of the system 18, as at block 42, inquiry is made at block 44 as to whether the output voltage is less than a preselected minimum value, designated $V_{min}$. I prefer to set $V_{min}$ at 13.0 volts for reasons hereinafter more fully explained. In any event, the value of $V_{min}$ should be set at about the output voltage of the system 18 which is just at or slightly above a low value wherein discharge of the battery 16 would ordinarily begin to occur, at least under conditions of light to moderate electrical loading on the alternator 18. Under conditions of light electrical loading on the system 18, the value $V_{min}$ may even be sufficiently high that no discharging of the battery 16 is occurring at normal idle RPM. While there is some leeway here in setting $V_{min}$, it should not be set so low that significant discharging will occur even at moderate electrical loads on the system 18 when the engine 12 is operating at normal idle RPM, and, of course, it should not be set so low that effectiveness of electrical devices operated by the system is decreased.

If the answer to the inquiry at block 44 is NO, then the programs returns to block 24 but, if YES, then the device 10 operates at block 46 to take control of the engine idle from the ECM 20 and to increase the idle level from the normal 800 RPM up to a safe maximum idle RPM level, designated $S_{max}$. It is at this point in FIG. 2 that the relay 23 of FIG. 1 is energized to shift the idle control from the ECM 20 to the device 10. In setting the voltage value for $V_{min}$, it is important to start the step of increasing engine idle speed before there has been a substantial discharge of the battery 16, at least for moderate electrical loading on the system 18. For a modern eight-cylinder gasoline engine I prefer to set $S_{max}$ at about 1300 RPM. However, $S_{max}$ would probably be a somewhat lower value for a diesel engine, preferably about 1100 RPM, and somewhat higher for four and six cylinder engines. In any case, $S_{max}$ should be selected at a high RPM level which is within a safe idle operating speed range for the particular engine 12 in use. Once $S_{max}$ is reached, the engine 12 is closely maintained at this constant speed by the device 10, even under varying electrical load conditions imposed on the system 18 by the vehicle electrical components and under varying engine loads. At the time when the idle RPM increase commences, as at block 46, a timer monitors elapsed time in this mode, as at block 48. Inquiry is then made at block 50 as to whether the elapse time has reached a preselected value, designated $T_1$. If NO, the program recycles to the block 46, as along the with line 56, but, if YES, then a determination is made, as at block 52, whether $V_{out}$, as at block 42, is at least equal to a preselected value falling within an acceptable operating voltage range for the system 18, preferably well above the voltage value at which the battery 16 will be discharging. See the dashed line 54 representing a pilot or monitor line, rather than a program flow line, all of which program flow lines are unbroken lines. I call this pre-selected value $V_{max}$ as shown in block 52 and prefer that it be established at about 13.8 volts.

If the inquiry at block 52 is NO, the device 10 resets or indexes the elapse time monitor, as at block 58, and recycles to the block 48 to monitor an additional elapse time $T_1$ or, in the present example, an additional 5.0 minute increment while the increased idle RPM, $S_{max}$, is maintained as at block 46. But if the inquiry at block 52 is YES, then the device 10 returns idle RPM control to the ECM 20, as at block 60, by de-energizing the coil 25 of the relay 23 (FIG. 1) to permit the relay switch to return to its normal de-energized state as shown. Upon de-energizing the relay 23, the program returns along the line 28 to its starting position at block 24. There are, of course, circumstances which are conceivable wherein the current demands of the system 18 will continue to be greater than the alternator of the system of the vehicle 14 is capable of providing, even when being driven by the engine 12 at the high RPM level, $S_{max}$, in which case, even though the engine 12 will continue to run at that level through successive 5.0 minute increments, the battery 16 will continue to supply the additional current required. While this will result in a discharge condition in a worse case scenario of heavy electrical loading on the system 18, the rate of discharge will at least be limited and minimized. But, where such heavy loading on the alternator of the system 18 is intermittent, there will usually be at least one time period $T_1$ out of several successive similar time periods during which, at high idle RPM, $S_{max}$, the battery 16 can be recharged while the system 18 is being brought back to the desired output voltage, $V_{max}$. The voltage value $V_{max}$ is selected such that, when achieved, and idle speed control is returned to the ECM 20, the output voltage $V_{out}$ will not decrease back to less than $V_{min}$ for at least one minute to avoid rapid and unstable oscillation between a low RPM idle control by the ECM 20 and idle control at a higher RPM by the device 10.

Referring now also to FIGS. 3A–3F, the latter mentioned figures show, in a preferred embodiment of my invention, a circuit diagram for the device 10 of FIG. 1. The circuit thus shown can be conveniently mounted on a standard circuit board of generally rectangular shape, preferably having broad surface dimensions of about 3 inches by 4 inches. A circuit board of such dimensions will permit it, with all components mounted thereon, to be disposed and mounted within a housing of the ECM 20 of the type found under the dashboard on the driver's side of a Ford Motor Company manufactured Crown Victoria model automobile for at least the model years 1995 through 2001. By mounting the circuit board within the housing of the ECM 20, the need for a lengthy wiring harness can be eliminated and, also, installation of the device 10 is greatly simplified.

The following table identifies the various components of the circuit of FIGS. 3A–3F. A CD-ROM appendix filed with the application of this patent contains the software programs for the microprocessors 66, 70 and 72 (identified in the program and in FIGS. 3A–3F as U4, U1 and U2, respectively) of the device 10.

TABLE

| Components of FIG. 3 | Description |
|---|---|
| 23 | 1-DPDT 12 vdc relay, 1 amp. rating |
| 62 | 1-#7805 12 vdc operated 5 vdc regulator |
| 64 | 8-20 pfd capacitors, 35 volt rating |
| 65 | 2-4.0 Mh crystals |
| 66 (also U4 in FIG. 3B) | 1-PIC 16C54 programmable microprocessor |
| 68 | 10-1K ohm, ¼ watt resistors |
| 70 (also U1 in FIG. 3C) | 1-PIC 16C55 programmable microprocessor |
| 72 (also U2 in FIG. 3D) | 1-PIC 16C54 pulse width modulated signal generator |
| 74 (also U3 in FIG. 3D) | 1-ADC 0820 analog-to-digital converter |
| 76 | 4-2n2222 NPN transistors |
| 78 | 2-47K ohm, ¼ watt resistors |
| 80 | 1-10K ohm, ¼ watt resistors |
| 82 | 1-TIP120 Darlington pair |
| 84 | 1-10K ohm, 35 watt resistor |
| 86 | 1-2k ohm, ¼ watt resistor |
| 88 | 1-DPST 12 vdc relay, 1 amp. rating |

Figure 3A:
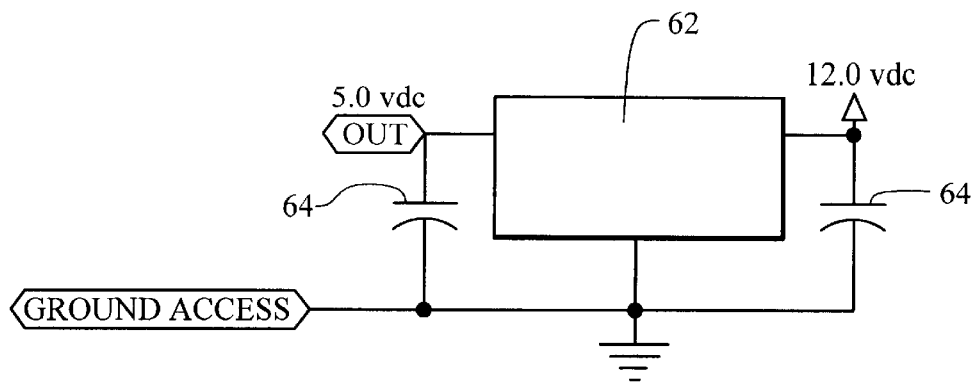
FIGS. 3A–3F show an electrical circuit diagram of the idle RPM control device of FIG. 1, thus illustrating a preferred embodiment of the device of my invention.
Figure 3B:
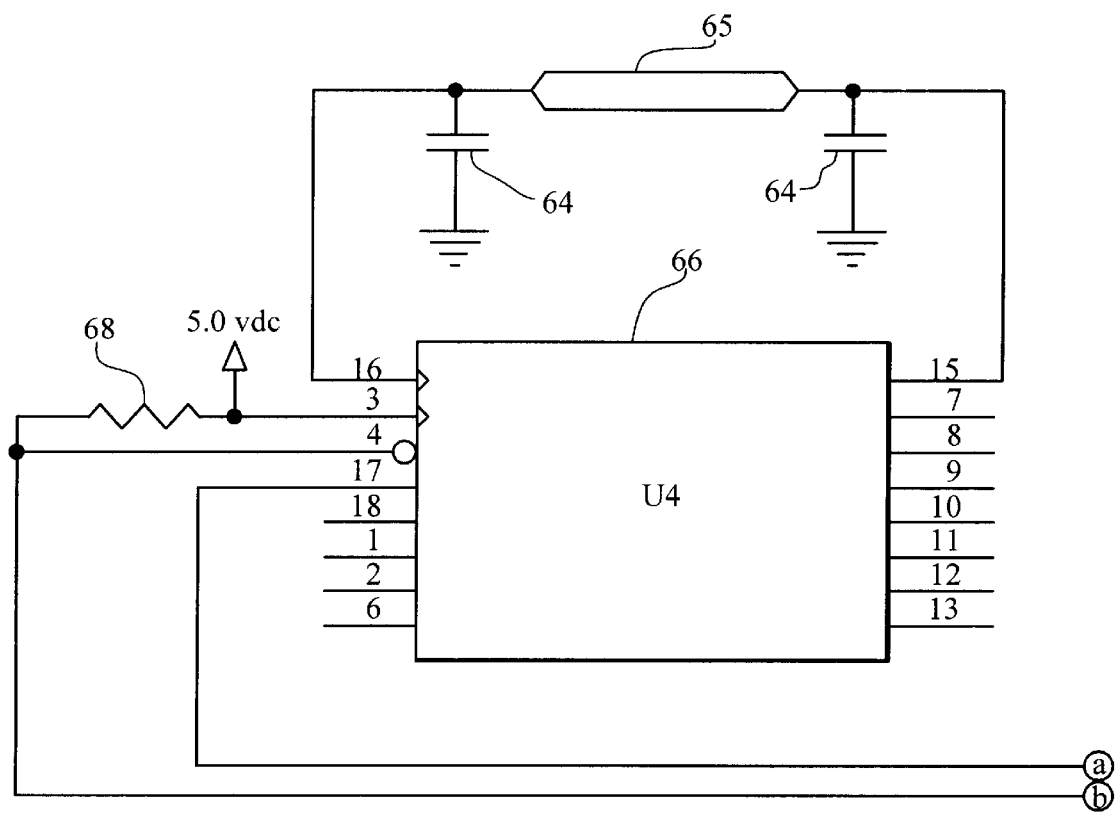
Figure 3C:
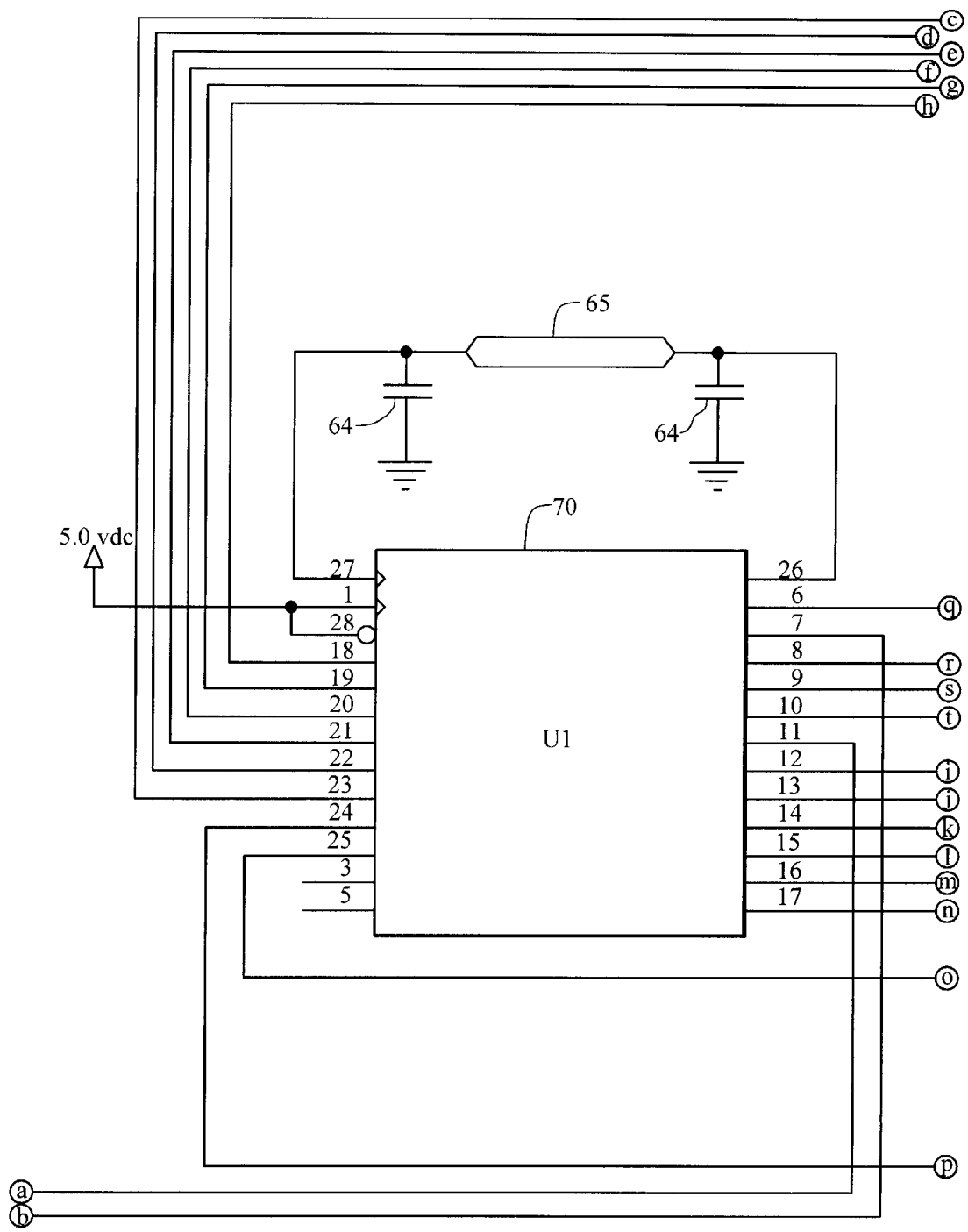
Figure 3D:
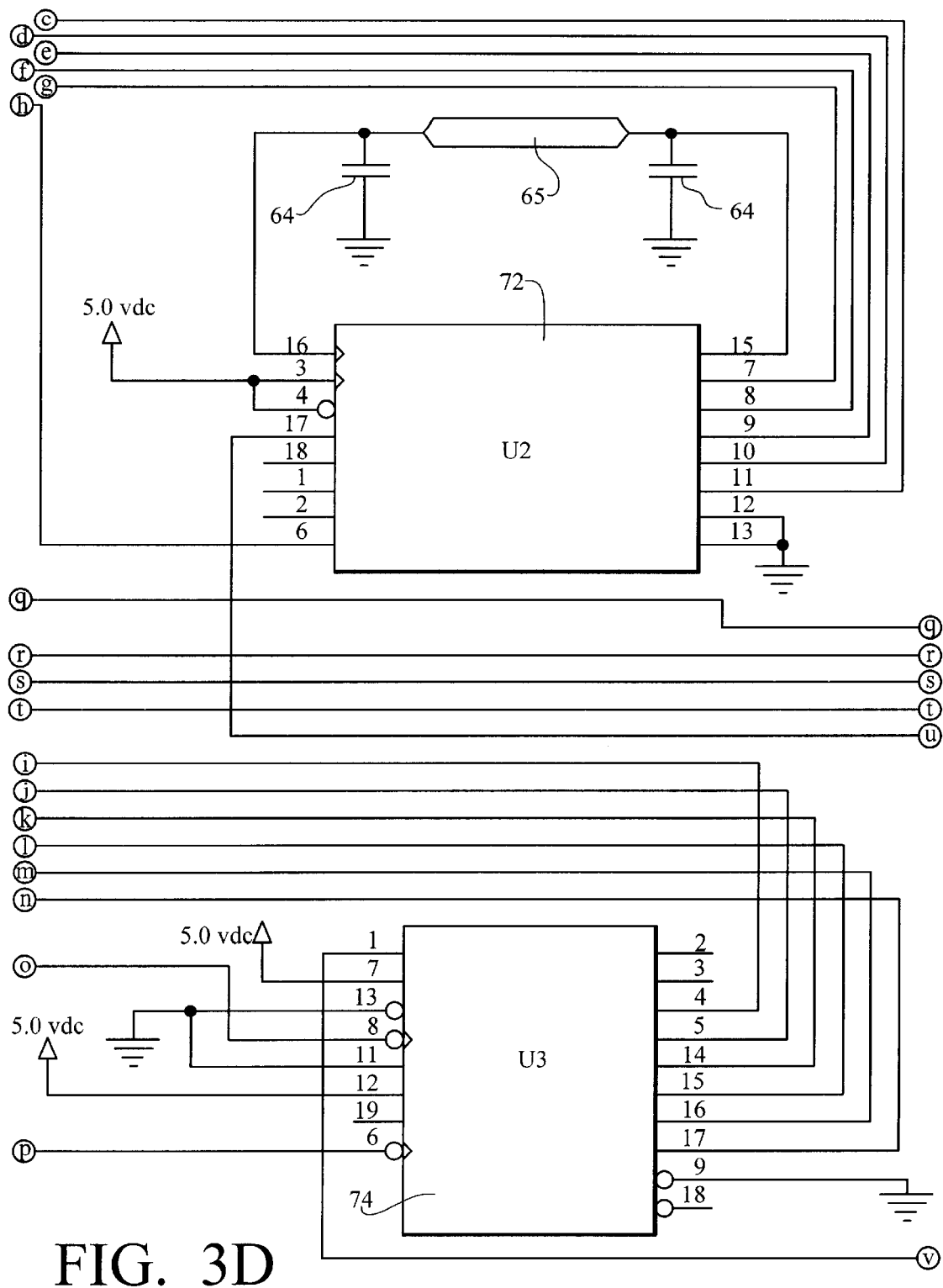
Figure 3E:
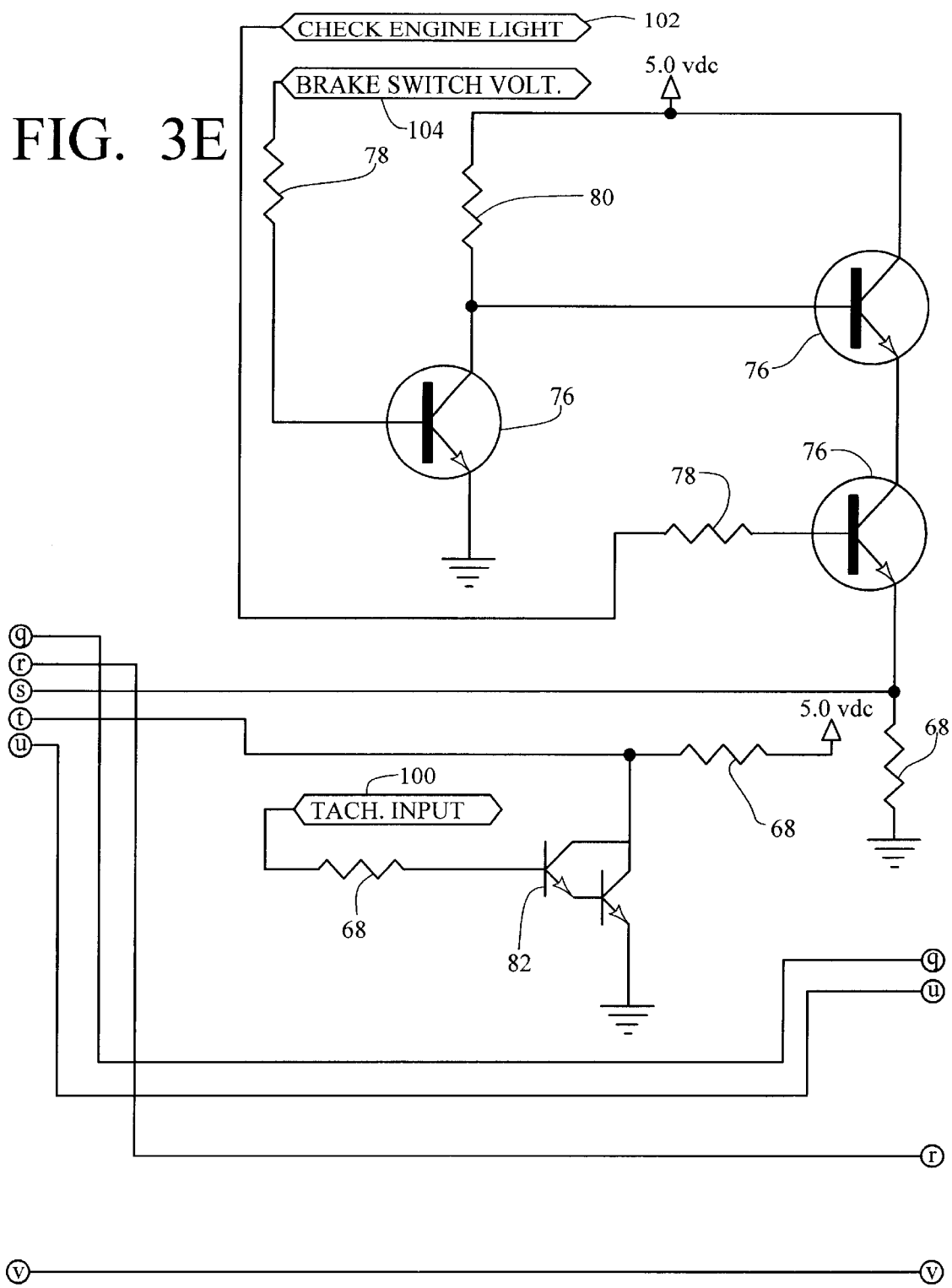
Figure 3F:
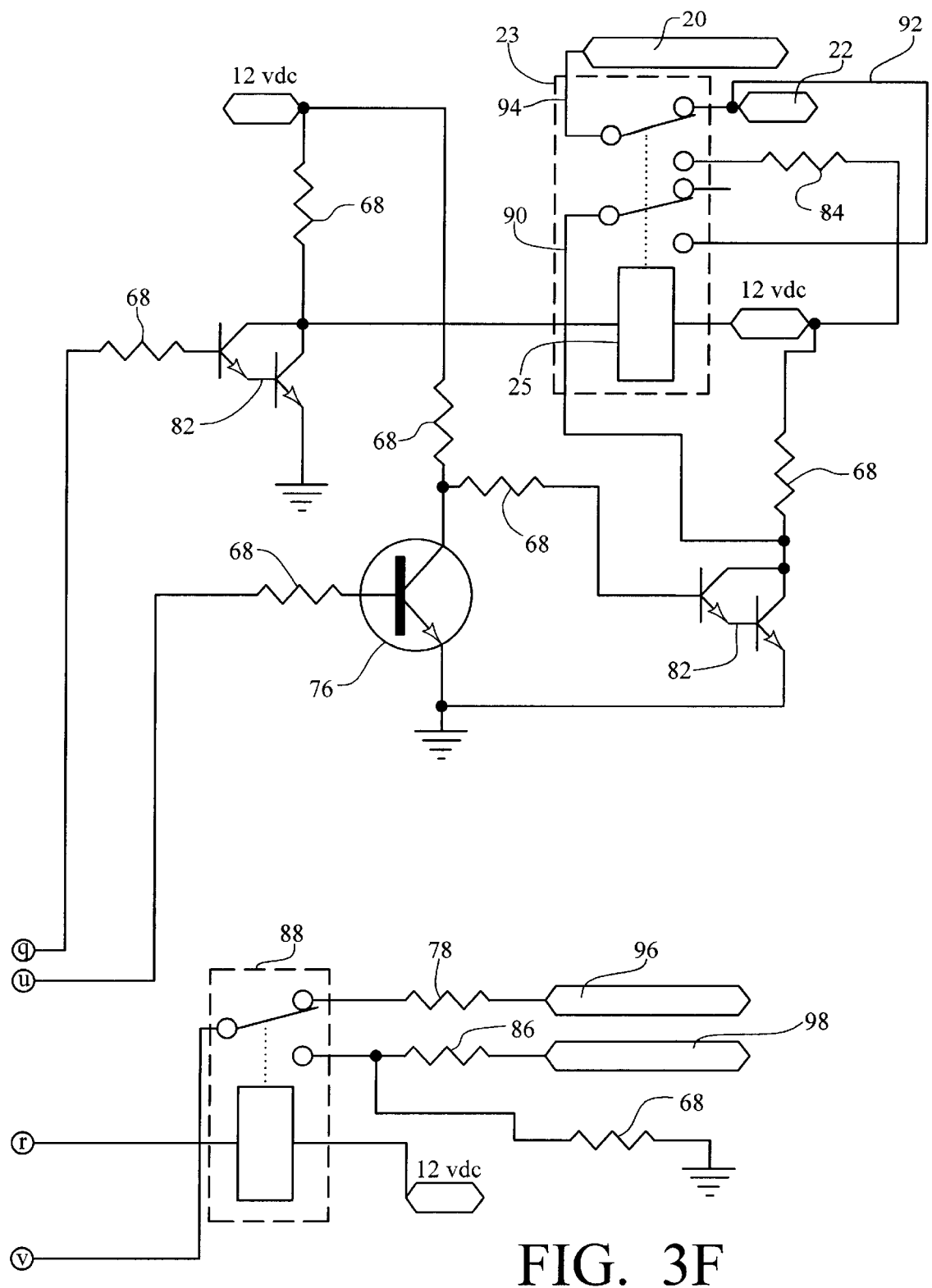

The charge timing processor 66 controls all timing activities of the device 10 whereas the main processor 70 coordinates all functions of the device 10. The processor 72 functions as a pulse width modulated signal generator which directly controls the idle speed control 22 of the vehicle 14 along output lines 90, 92 when the relay 23 is energized (see FIGS. 1 and 3F). While the relay 23 is shown in FIG. 1 as a double pole, single throw relay for simplicity in illustrating the general function of the device 10, the relay 23 of the circuit of FIG. 3F is, preferably, a double pole, double throw relay 23 which, while performing the same function, also maintains a load, namely, the resistor 84, on an idle speed control line 94 of the ECM 20 while the relay 23 is activated. The purpose of this additional function of the relay 23 is to prevent the ECM 20 from erroneously sensing a fault in its idle speed control circuit during the period when the device 10 is activated.

The relay 88 of FIG. 3F is used to alternate between sampling whether a gear selector switch of the transmission of the vehicle 14 is in a park condition, as at 96, and sampling of the output voltage of the power generating system 18, as at 98 (see also line 98 in FIG. 1). The relay 88 switches between these two states every 30 seconds while the device 10 is active. Speed of the engine 12 is monitored by sampling a tachometer operating input signal, as at 100, in FIG. 3E. The circuit of the device 10 of as shown in FIGS. 3A–3F is also adapted to block or cease operation in favor of operation of the engine idle control valve by the ECM 20 should a check engine light 102 of the vehicle 14 become activated (See FIG. 3E). This is an additional feature of the device 10 instituted as a precaution as, for example, where the engine 12 might be dangerously low on oil. Brake input switch voltage is also monitored by the circuit of the device 10 at 104 in FIG. 3E. If voltage is high, meaning above chassis ground, at either or both of the inputs 102 or 104, the transistors 76 of FIG. 3E will operate to block activation of the relay 23 and, thus, block operation of the device 10 until the high voltage at those inputs is eliminated. Finally, the circuit of FIG. 3A is a 12.0vdc to 5.0vdc regulated power supply for powering the various active components of the circuit. See table for description of components thereof.

The circuitry of the device of my invention can also be combined with and made a part of the circuitry of an otherwise standard ECM of the vehicle in which it us used.

Although the present invention has been explained and illustrated with respect to specific details of certain preferred embodiments thereof, it is not intended that such details limit the scope of this patent other than as specifically set forth in the following claims, taking into consideration all reasonable equivalents thereof.

I claim:

1. A method for controlling an idle RPM level of an engine of a motor vehicle for preventing or at least limiting a disruptive discharge of a storage battery of an electrical power generating system of said vehicle, the steps of which comprise monitoring an output voltage of an electrical power generating system of said vehicle;

determining when said output voltage is less than a first preselected minimum value;

automatically increasing an idle RPM level of said engine from a normal idle RPM level to a higher preselected maximum idle RPM level in response to said output voltage being less than said first preselected minimum value; and maintaining said higher preselected maximum idle RPM level, independent of loading on said engine, to increase said output voltage.

2. The method of claim 1, the steps of which further comprise monitoring a length of time since said engine has been running since said engine was last started;

blocking initiating of said step of automatically increasing until said length of time equals a first preselected minimum elapse time.

3. The method of claim 2 wherein said first preselected minimum elapse time is within range of from about 3.0 to about 5.0 minutes.

4. The method of claim 1, the steps of which further comprise
monitoring a condition of a transmission of said vehicle;
determining that said transmission is disposed in a park condition;
blocking initiation of said step of automatically increasing when said transmission is disposed in a condition other than said park condition; and
ceasing execution of said steps of increasing and maintaining immediately upon a change in said condition of said transmission from said park condition to any other condition when either of said steps of increasing and maintaining are in progress.

5. The method of claim 1 wherein the step of monitoring an RPM level of an engine comprises determining that said RPM level is greater than a crank speed of said engine which occurs during ignition starting.

6. The method of claim 1 wherein the step of monitoring an RPM level of an engine comprises determining that said RPM level is at least 600 RPM when said engine comprises an eight cylinder gasoline engine.

7. The method of claim 1 wherein said first preselected minimum value of said output voltage is about 13.0 volts when a normal maximum operating output voltage of said system is at least 13.8 volts.

8. The method of claim 1 wherein said preselected maximum RPM level is about 1300 RPM when said engine is a gasoline powered eight cylinder engine.

9. The method of claim 1 wherein said preselected maximum RPM level in about 1100 RPM when said engine is a diesel powered eight cylinder engine.

10. The method of claim 1, the steps of which further comprise releasing control of said idle RPM level to an ECM of said vehicle to permit said idle RPM level to decrease from said preselected maximum idle RPM level to said normal idle RPM level after said output voltage has increased to said preselected maximum value.

11. The method of claim 1, the steps of which further comprise
monitoring a foot brake switch position of said vehicle;
determining when a foot brake of said vehicle is activated;
blocking initiation of said step of increasing so long as said foot brake is activated; and
ceasing execution of said steps of increasing and maintaining immediately upon activation of said foot brake when said steps of increasing and of maintaining are in progress.

12. The method of claim 1, the steps of which further comprise
monitoring an elapse time from initiation of said step of automatically increasing while said step of maintaining is in progress;
determining when said elapse time is equal to a preselected elapse time;
comparing said output voltage to said preselected value at said preselected elapse time;
returning idle RPM control to an ECM of said vehicle provided that said output voltage is at least equal to said preselected value at said preselected elapse time;
indexing an elapse time monitor at said preselected elapse time; and
repeating said steps of elapse time monitoring, determining when said elapse time is equal to a preselected elapse time and comparing when said output voltage is less than said preselected value at the conclusion of said preselected elapse time provided that said output voltage is less than preselected value.

13. The method of claim 1, the steps of which further comprise monitoring a position of a throttle of said engine;
determining that said throttle is in an idle position;
blocking initiating of the step of increasing when said throttle is in a position other than said idle position; and
ceasing execution of said steps of increasing and maintaining when said throttle is in a position other than said idle position.

14. The method of claim 1, the steps of which further comprise
monitoring activation of a check engine light;
blocking initiation of the step of increasing when said check engine light is active; and
terminating execution of said steps of increasing and maintaining upon activation of said check engine light when said steps of increasing and maintaining are in progress.

15. The method of claim 1, wherein the step of maintaining includes maintaining said preselected maximum idle RPM level at least until said output voltage increases from said first value to a preselected maximum value which is greater than said first value.

16. An electronic device for controlling idle RPM of an engine of a motor vehicle to prevent or at least limit disruptive discharge of a battery of an electrical power generating system of said engine and vehicle, said device comprising
means for determining that a transmission of said vehicle is disposed in a park condition;
means for monitoring an output voltage generated by said system;
means for comparing said output voltage with a preselected minimum value;
means for increasing an idle RPM of said engine from a normal idle RPM level to a preselected maximum idle RPM level when said output voltage is less than said preselected minimum value to increase said output voltage;
means for maintaining said maximum idle RPM level, I independent of loading on said engine, at least until said output voltage increases to a preselected maximum value; and
means for decreasing an idle RPM of said engine from said preselected maximum idle RPM level to said normal idle RPM level after said output voltage increases to a preselected maximum value.

17. A device for controlling an idle speed of an engine of a motor vehicle comprising
means for monitoring an output voltage of an electrical power generating system of said vehicle;
means for determining when said output voltage is less than a first preselected minimum value;
means responsively connected to said determining means for automatically increasing an idle speed level of said engine from a normal idle speed level to a preselected maximum idle speed level when said output voltage is less than said first preselected minimum value; and
means for maintaining said maximum idle speed level independent of loading on said engine to increase said output voltage.

18. The combination of claim 17 wherein said device further comprises means for switching said relay for switching said idle control means from control by said second output signal generating means back to control by said ECM in response to a third signal from said monitoring means indicative that said output voltage is at least equal to a preselected maximum value greater than said preselected minimum value.

19. The combination of claim 17 wherein said device further comprises second means for determining that a transmission of said vehicle is in a condition other than a park condition; and means responsively connected to said second determining means for preventing the switching of said relay when said transmission is in a condition other than said park condition.

20. The combination of claim 17 wherein said device further comprises second means for determining that a foot brake of said vehicle is activated; and means responsively connected to said second determining means for preventing the switching of said relay when said foot brake is activated.

21. The combination of claim 17 wherein said device further comprises first timing means for determining a running time of said engine from its most recent start; and means responsively connected to said first timing means for preventing the switching of said relay until said running time has reached a preselected running time.

22. In combination with a conventional ECM of a motor vehicle which is used to set and maintain an idle speed of an engine of said vehicle within a normal idle speed range when said engine is operating in a normal operating temperature range, an electronic device for assuming control of said idle speed from said ECM in response to a low output voltage of an electrical power generating system of said engine and vehicle, said device comprising first means for determining that said engine is running;

first means for monitoring an output voltage of an electrical power generating system of said engine and vehicle, said first monitoring means generating a first output signal indicative that said output voltage is less than a preselected minimum value when said engine is running;

means responsively connected to said first monitoring means for generating a second output signal for controlling an idle speed control means of said engine to increase the idle speed of said engine from said normal idle speed range to a preselected maximum idle speed in response to said output voltage being less than said preselected minimum value; and an electrical relay for switching said idle speed control means from control by said ECM to control by said second output signal generating means in response to said output voltage being less than said preselected minimum value.

23. A device for assuming control of an idle speed control apparatus of an engine of a motor vehicle which is normally controlled by an ECM of said vehicle, said device comprising means for monitoring an output voltage of an electrical power generating system of said engine and vehicle;

means responsively connected to said monitoring means for generating a first signal indicative that said output voltage is less than a first preselected minimum value;

means responsively connected to said first signal generating means for generating a second signal which is capable of controlling said idle speed control apparatus of said engine to increase an idle speed of said engine from a normal idle speed level to a higher preselected maximum idle speed level; and means responsively connected to said first signal generating means for switching control of said idle speed control apparatus from said ECM to said second signal generating means in response to said first signal.

24. The device of claim 23 wherein said switching means comprises a relay.

25. The device of claim 24 wherein said relay normally connects said ECM to said apparatus when said relay is in a de-energized condition and connects said second signal generating means to said apparatus in place of said ECM when said relay is in an energized condition.

26. The device of claim 23 further comprising means responsively connected to said monitoring means for operating said switching means to return control of said idle speed control apparatus from said second signal generating means to said ECM after said output voltage has increased from less than said preselected minimum value to a higher preselected maximum value.

27. In an electronic control module of a motor vehicle, a device for controlling an idle RPM of an engine of said vehicle in response to a low output voltage of an electrical power generating system of said vehicle, said device comprising means for monitoring an output voltage of an electrical power generating system of a motor vehicle;

means for generating a first signal in response to said output voltage being less than a first preselected minimum value; and means responsively connected tom said first signal generating means for increasing an idle speed level of said engine from a normal idle speed level to a higher maximum idle speed level in response to said output voltage being less than said first value to increase said output voltage.

* * * * *